United States Patent [19]

Schulz et al.

[11] 4,343,519
[45] Aug. 10, 1982

[54] BEARING FOR THE CYLINDERS OF PRINTING MACHINES

[75] Inventors: Horst Schulz, Dresden; Arndt Jentzsch, Coswig; Werner Kühnert, Radebeul; Heiner Fink, Dresden; Frank Junker, Radebeul; Günter Lehmann, Coswig; Hans Johne; Peter Kahlert, both of Radebeul; Norbert Dittmann, Dresden, all of German Democratic Rep.

[73] Assignee: VEB Kombinat Polygraph "Werner Lamberz" Leipzig, Leipzig, German Democratic Rep.

[21] Appl. No.: 152,575

[22] Filed: May 23, 1980

[51] Int. Cl.³ .............................................. F16C 23/02
[52] U.S. Cl. ......................................... 308/37; 308/61
[58] Field of Search ........... 308/61, 37, 237 A, 237 R, 308/72, 58

[56] References Cited

U.S. PATENT DOCUMENTS

| 536,048 | 3/1895 | Schofield | 308/237 A |
| 693,247 | 2/1902 | Edwards | 308/237 A |
| 4,090,746 | 5/1978 | Harkins et al. | 308/237 A |
| 4,105,261 | 8/1978 | Myers et al. | 308/72 |

Primary Examiner—Lenard A. Footland
Attorney, Agent, or Firm—Michael J. Striker

[57] ABSTRACT

A bearing arrangement for cylinders utilized in printing machines serves for supporting a cylinder trunnion in a machine frame. The bearing arrangement is composed of a sliding bushing surrounding the cylinder trunnion, a flange bearing supported in the machine frame and encompassing the sliding bushing. A second bushing is mounted between the flange bearing and the machine frame which has an outwardly radially extending central collar arranged in contact with the internal axial bore of the machine frame and two bonding elements inserted between the spaces in the second bushing formed by said collar and the axial bore of the frame for compensation of misalignment between the bearing and the machine frame when the cylinder trunnion is inserted into the frame.

5 Claims, 1 Drawing Figure

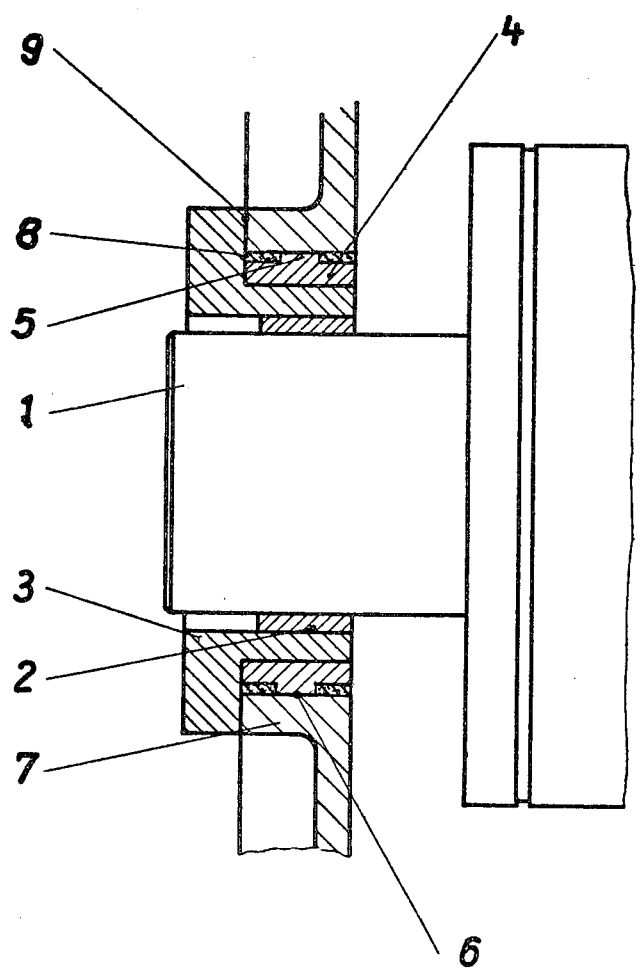

BEARING FOR THE CYLINDERS OF PRINTING MACHINES

BACKGROUND OF THE INVENTION

Field of Application

The invention relates to a bearing for cylinders of printing machines.

Cylinders bearings are known wherein the cylinder trunnions are supported in bushings which in turn are supported in machine frames and bolted thereon. (DE Letter of Disclosure No. 2 138 956).

It is of disadvantage therein that compensation of faulty alignment of bores is not possible, since the position of the bearing within the machine frame is predetermined on one hand by the bolted connection onto the machine frame, and on the other by the respective centering of the bearing within the machine frame, so that alignment toward the bearing trunnion cannot be ensured.

Any faults must be compensated by a sufficiently large play of the bearing trunnion relative to the bearing bushing. Too great a bearing play will however lead to faulty printing in the printing machine.

SUMMARY OF THE INVENTION

It is the object of the invention to avoid faulty printing caused by too large play within the cylinder bearings.

It is another object of the invention to achieve compensation of faulty alignment of bores without the bearing trunnion becoming distorted.

These and other objects are attained by a bearing where a flange bearing is supported in the bore of the frame by means of a bushing with a centering collar of a width less than the depth of the bore, and that provision is made for a bonding agent which after compensation of alignment faults will penetrate between the inner wall of the bore within the frame and the bushing outside of the centering collar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The appurtenant drawing shows a sectional representation of a cylinder bearing according to the invention.

DETAILED DESCRIPTION OF THE PREFERRED EMBODIMENT

The drawing shows a cylinder support, wherein a cylinder trunnion 1 runs within a sliding bushing 2 upon which a flange bearing 3 is arranged. A bushing 4, provided with a centering collar 5 is located on the flange bearing 3. A bonding agent 8 serving to compensate faults in the bore alignment and for bonding the bushing 4 is provided between the inner wall 6 of the bore formed in a frame 7 and the bushing 4. The frame 7 has a face 9 arranged in contact with the respective face of bearing 3.

Compensation of faulty bore alignment may be effected either by elastic distortion of the flange bearing 3 which is arranged to be partially spaced in the radial direction from the outer surface of the trunnion 1 because of the width of bushing 2 or by adjusting the respective face of the flange bearing 3 relative to the face 9 of the frame 7. The width of the centering collar 5 is less than the depth of the bore, or it is so dimensioned that upon compensation there will be no distortion within the inner bore wall 6 of frame 7.

It will be understood that each of the elements described above, or two or more together, may also find a useful application in other types of bearing for the cylinders of printing machines differing from the types described above.

While the invention has been illustrated and described as embodied in a bearing for the cylinders of printing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bearing arrangement for cylinders utilized in printing machines and adapted to support a cylinder trunnion within a machine frame, comprising a first sliding bushing encompassing the cylinder trunnion; a flange bearing surrounding said sliding bushing, said flange bearing being supported in the machine frame and having a radially extending face mounted in contact with the respective face of the machine frame and an axially extending circumferential surface, said machine frame being provided with an axial bore; and means for compensating for misalignment between said flange bearing and the machine frame including a second bushing mounted between said axially extending circumferential surface of said flange bearing and said axial bore of the machine frame.

2. The arrangement of claim 1, wherein said second bushing is formed with a radially outwardly extending collar being in contact with said axial bore of the machine frame and having a width which is less than the depth of said axial bore so that two lateral annular recesses are formed between said axial bore and said second bushing.

3. The arrangement of claim 2, further including a pair of bonding agents inserted into said recesses, respectively.

4. The arrangement of claim 3, wherein said collar is formed substantially at the center of said bushing in the axial direction thereof.

5. The arrangement of claim 4, wherein said bonding agents penetrate between said axial bore of the machine frame and said second bushing after said compensation has been obtained.

* * * * *